Nov. 6, 1962 W. R. LAVIS ET AL 3,062,387
BUFFER UNIT
Filed July 7, 1960

3,062,387
BUFFER UNIT
William R. Lavis, 40 Mount Ayliff St., St. Helena, Welkom, and Hans R. Dillner, 34 Pretorius St., Dagbreek, Welkom, both of Republic of South Africa
Filed July 7, 1960, Ser. No. 41,338
Claims priority, application Republic of South Africa July 14, 1959
4 Claims. (Cl. 213—223)

This invention relates to buffers which may be adapted for use either as a coupling buffer or which may be used to provide resilient wheel suspension units for conveyances.

An object of the invention is to provide a simple unit wherein the coupling buffer will be capable of absorbing both direct thrusts and pulls as well as lateral thrusts and pulls.

A further object of this invention is to provide a simple and effective wheel suspension means for conveyances which will provide adequate resilience in the mountings and ensure that each wheel will support its correct proportion of the weight of the conveyance.

According to this invention there is provided a buffer unit for resiliently coupling two parts together comprising a central element positioned between a pair of oppositely disposed elements spaced apart, resilient members retained between the elements, one of the pair of elements adapted to be secured to one of the parts to be resiliently coupled together and the central element adapted to be secured to the second part and means to constrain relative movement of the elements to one plane.

Further features of this invention provide for the buffer to form a resilient wheel suspension assembly for a conveyance with one element secured to or forming part of the body of the assembly and the other secured to or forming part of the axle housing.

The invention also provides for one element to be secured to or form part of the body of the assembly while the other is resiliently retained therein and adapted to be coupled to a further conveyance through a similar assembly.

Preferred embodiments of this invention will be described with reference to the accompanying drawings in which.

Both embodiments illustrated show the invention as applied to rail trucks but it will be understood that the invention may be used on other conveyances without departing from the scope of this invention.

Figure 1:
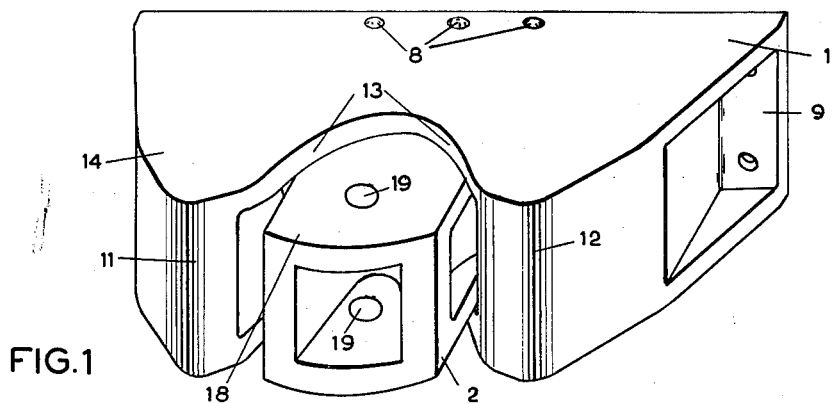
FIG. 1 is a perspective view of the buffer used as a coupling.
Figure 2:
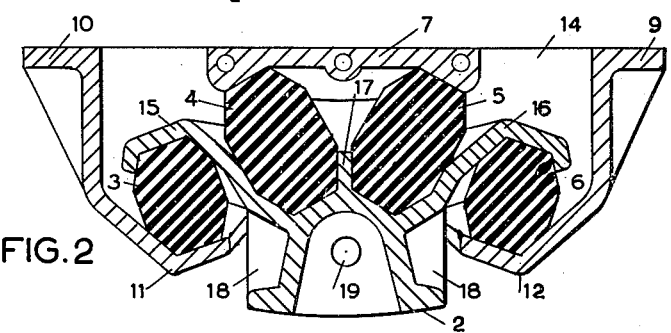
FIG. 2 is a horizontal sectional view of the coupling in FIG. 1.

In FIGS. 1 and 2 a main buffer housing 1 forming a pair of oppositely disposed elements in fixed horizontal spaced relation is adapted to enclose the buffer member 2 forming a central element between the oppositely disposed pair of elements with rubber pads 3, 4, 5 and 6 being located between the buffer member 2 and the buffer housing as illustrated. A retaining plate 7 is provided which is secured in position by bolts 8 or the like between the top and bottom plates 14 of the buffer housing 1. Buffer housing securing flanges 9 and 10 are provided for securing the buffer housing to the front and back of a truck. Shaped flanges 11 and 12 are provided on the front of the buffer housing to provide cradle seats for a pair of rubber pads 3 and 6 on either side of an aperture 13. The top and bottom plates 14 of the buffer housing locate the buffer member 2 therebetween and permit the buffer member to move in a horizontal direction only, either forwards or backwards or to the one or other side of the buffer housing.

The buffer member 2 consists of a buffer head, shaped flanges 15 and 16 projecting from each side of the member and a web 17 projecting back from the head, the two ends 15 and 16 of the flanges being turned inwards towards the front of the buffer housing to form two cradle seats for retaining the rubber pads 3 and 6 between each flange and the front of the buffer housing. The head of the buffer member is provided with side walls 18 and a coupling hole 19 for coupling purposes.

In operation the provision of the two rubber pads 4 and 5 between the buffer member 2 and the retaining plates 7 as well as the two rubber pads or coil springs 3 and 6 between the buffer member 2 and the front of the buffer housing cushion or absorb any direct thrust or pull on the buffer head as well as cushioning any diagonal push or pull applied to the buffer head.

The buffer housing 1 and buffer member 2 are made from metal and can either be cast or made up from welded metal plate. It will be appreciated that the shapes of the resilient rubber pads may be varied and in fact other resilient members such as suitably shaped metal springs may also be used.

Figure 3:
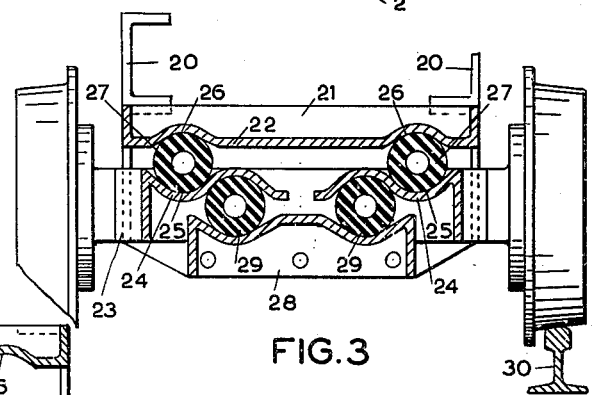
FIG. 3 is a part sectional end view of the buffer used for wheel suspension of a rail truck.
Figure 4:
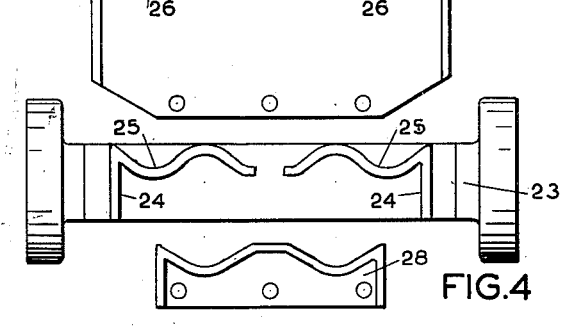
FIG. 4 is a similar view but with the parts separated.

FIGS. 3 and 4 illustrate the invention as applied to wheel suspension for a rail truck and in this case the rubber pads are shown as being of cylindrical shape circular in cross-section.

In this embodiment the truck chassis 20 has depending therefrom a hollow body member 21, for each axle, the body member has in the upper portion thereof a pocketed plate 22 and the axle mounting 23 is adapted to fit into the body member 21 and carries further plates 24 having pockets 25 on either side of the axle mounting, these plates 24 having the pockets 25 oppositely disposed to those 26 in the plate 22 carried in the body member 21. Resilient pads 27 of a rubber or similar material are positioned between the oppositely disposed pockets 25, 26. The front and rear walls of the body member prevent movement of the axle mounting 23 in the longitudinal direction of the truck.

To secure the axle mounting 23 in position a bottom cover piece 28 is provided for the body member 21 and adapted to be bolted thereto. This cover piece 28 cooperates with the plates 24 on the axle mounting in similar manner to that described above to retain further resilient pads 29 in position. In this example the plate 22 and cover piece 28 form the pair of oppositely disposed pair of elements in fixed vertical spaced relation while the plates 24 form the central element.

In use the resilient pads 27 and 29 allow the axle to oscillate in a vertical plane to compensate for any irregularities or unevenness in the track 30 and ensure that all the wheels remain substantially at all times in contact with the track. The wheels thus always carry their full proportion of the load.

The location of the resilient pads 27 and 29 also provides adequate resistance to any side thrust on the wheels, when the truck negotiates bends. Further, all vertical movement of the axle takes place through contact between metal and the resilient pads except for the necessary vertical guide faces on the suspension body member 21 for the axle housing 23. Sufficient clearance is provided between these faces to prevent binding and lubrication is therefore unnecessary.

Maintenance of the above described units is simple and may readily be effected by unskilled labour and under normal conditions will only require replacement of the resilient pads at infrequent intervals.

It will of course be appreciated that the number, size, shape and positioning of the pads may be determined by particular operating conditions. The suspension unit has been described and illustrated as applied to a narrow truck with a single body member extending the full width of the truck and it will be appreciated that separate units may be mounted adjacent each wheel.

We claim:

1. A buffer for resiliently coupling two members together, the buffer comprising a buffer member and a buffer housing each being coupled respectively to one of said members, said buffer housing including a pair of flanges, and a retaining plate in spaced relation with said flanges the buffer member including flanges projecting between the retaining plate and the flanges of the buffer housing to respectively define adjacent pockets therewith, all of said flanges being constituted by planar portions connected together in angulated fashion such that said pockets are bounded in part by the planar portions, and polygon shaped elastic members having sides corresponding to the shape of said pockets, each of the elastic members being supported in compressed state in a corresponding one of the pockets and having sides in engagement with the planar portions of the flanges such that adjacent elastic members exert forces on the flanges of the buffer member and the flanges and the retaining plate of the buffer housing respectively to urge the same apart, each said elastic member being supported in a respective one of said pockets along a plurality of the planar portions of the flanges to resist relative movement in all directions of said buffer member and said buffer housing.

2. A buffer for resiliently coupling two members together, the buffer comprising a buffer member and a buffer housing each being coupled respectively to one of said members, said buffer housing including a pair of flanges, and a retaining plate in spaced relation with said flanges, the buffer member including flanges projecting between the retaining plate and the flanges of the buffer housing to respectively define adjacent pockets therewith, all of said flanges being constituted by planar portions connected together in angulated fashion such that said pockets are bounded in part by the planar portions, and polygon shaped elastic members having sides corresponding to the shape of said pockets, said planar portions of the flanges being arranged to define tilted pockets such that said elastic members are respectively supported in said pockets in tilted condition and in engagement with the planar portions of the flanges, said elastic members normally being larger than said pockets such that said elastic members are in compressed state in said pockets to exert forces thereon, said forces extending in a plurality of directions such that said elastic members are self supporting in said pockets and resiliently resist deformation in all directions.

3. A buffer as claimed in claim 2 wherein said buffer member and buffer housing are arranged about an axis of symmetry, said pockets being tilted with respect to said axis of symmetry.

4. A buffer as claimed in claim 3 wherein four pockets are provided, the pockets closer to the axis of symmetry being defined by the retaining plate of the buffer housing and the flanges of the buffer member, and the pockets further from the axis of symmetry being defined by the flanges of the buffer housing and the flanges of the buffer member.

References Cited in the file of this patent

UNITED STATES PATENTS

| 1,649,835 | Lovejoy | Nov. 22, 1927 |
| 1,880,504 | Shields | Oct. 4, 1932 |
| 1,920,436 | Riker | Aug. 1, 1933 |
| 2,154,586 | Stern | Apr. 18, 1939 |
| 2,368,727 | Robinson | Feb. 6, 1945 |
| 2,757,950 | Hagenbook | Aug. 7, 1956 |

OTHER REFERENCES

| 595,632 | Germany | Apr. 16, 1934 |
| 475,461 | Great Britain | Nov. 19, 1937 |